United States Patent [19]

Fuller et al.

[11] Patent Number: 4,990,264
[45] Date of Patent: Feb. 5, 1991

[54] ORE DEWATERING PROCESS AND COMPOSITIONS THEREFOR

[75] Inventors: James G. Fuller, Dublin; Owen Portwood, Columbus; Joe W. Cotton, Ostrander, all of Ohio

[73] Assignee: Sherex Chemical Company, Inc., Dublin, Ohio

[21] Appl. No.: 421,092

[22] Filed: Oct. 13, 1989

[51] Int. Cl.$^5$ .............................................. B01D 21/01
[52] U.S. Cl. .................................... 210/729; 210/778; 252/60; 209/5
[58] Field of Search ............... 210/729, 770, 777, 778; 252/60; 75/101 R; 209/5

[56] References Cited

U.S. PATENT DOCUMENTS

| | | | |
|---|---|---|---|
| 4,039,466 | 8/1977 | Matsuda et al. | 210/729 |
| 4,097,390 | 6/1978 | Wang et al. | 210/729 |
| 4,410,431 | 10/1983 | Roe | 210/778 |

Primary Examiner—W. Gary Jones
Assistant Examiner—Krisanne Shideler
Attorney, Agent, or Firm—Mueller and Smith

[57] ABSTRACT

The present invention is directed to a dewatering aid which functions unexpectedly efficiently in the dewatering of a particulate solids slurry, e.g. mineral ore concentrate or slurry, wherein a dewatering aid is added thereto followed by filtration of the slurry. Such improved dewatering results are achieved by adding to the mineral ore slurry, an effective amount of a dewatering aid comprising an alkoxylated $C_6$–$C_{11}$ alkanol or alkanoic acid wherein alkoxylation is conducted with propylene oxide or butylene oxide.

8 Claims, 1 Drawing Sheet

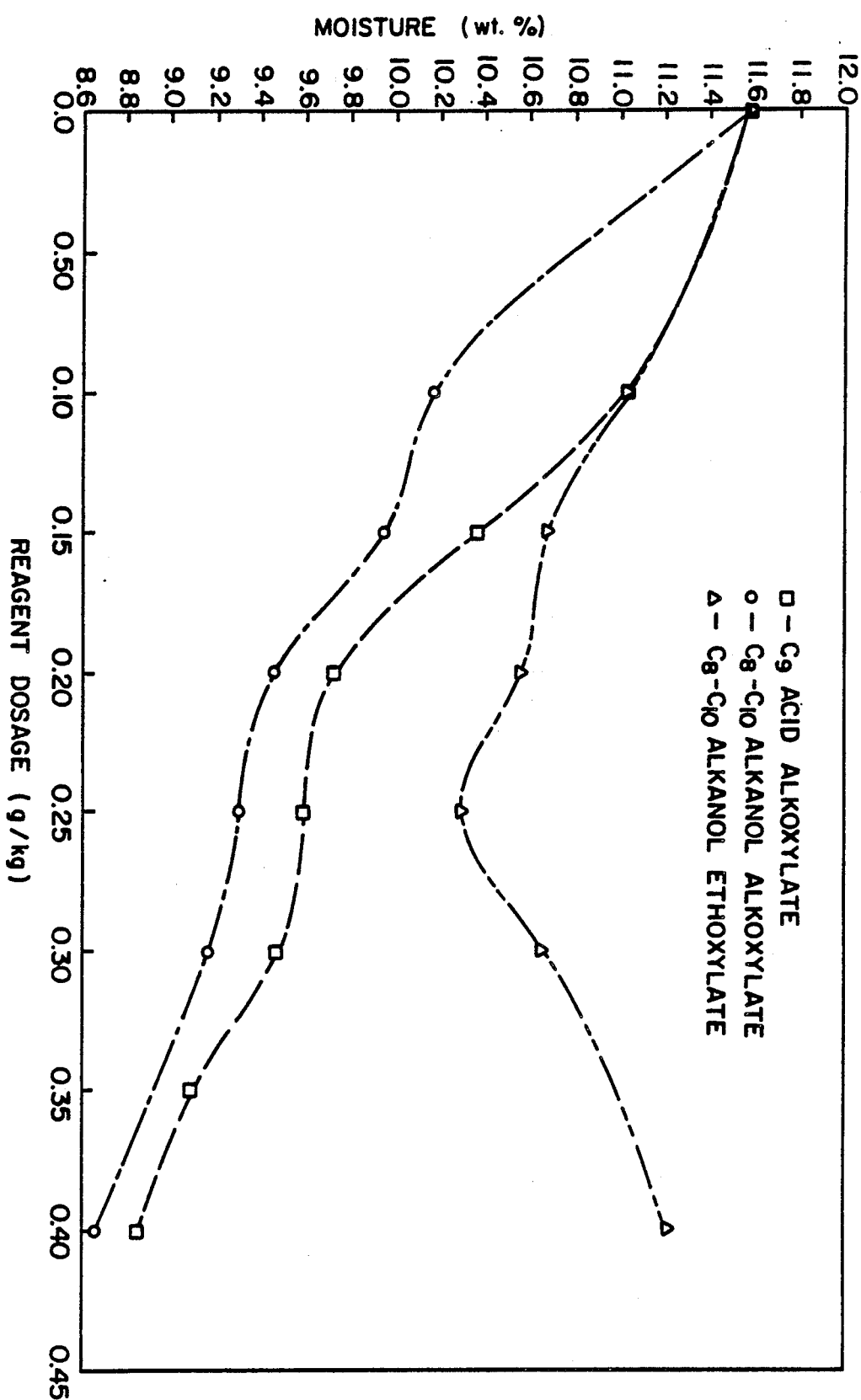

ORE DEWATERING PROCESS AND COMPOSITIONS THEREFOR

BACKGROUND OF THE INVENTION

The present invention relates to dewatering of various mineral concentrates and more particularly to an improved dewatering process and dewatering aids therefor.

The vast majority of mineral processing methods require that the valuable mineral constituent(s) be separated in aqueous slurry form. After separation, the various mineral values must be dewatered to enable further processing and/or for recycle of the water for economical and/or ecological reasons. Further economic justification for dewatering includes lowering of transportation costs; lowering of energy costs during filtration; and elimination of freezing of the concentrates in railroad cars, barges, silos, stockpiles, etc. Additionally, chemical dewatering in filters can range from about 3 to 25 times less expensive than thermal drying.

Most commercial liquid/solid separation is effected by a rotary (drum or disk) vacuum filtration system. Filtration often is insufficient to meet the residual water specification and must be supplemented by thermal drying. Drum filters have been described in the literature as a rotating drum covered with filter cloth which rotates with its lower portion immersed in a continuously fed bowl with vacuum being applied beneath the cloth causing solids to deposit as a cake while filtrate passes therethrough. As the drum rotates, the filter cake leaves the slurry and air is drawn therethrough in a dewatering step, often known as the drying step. Dewatering aids are known to be effective in such drying step of the process. Finally, the dewatered filter cake is discharged by a variety of techniques including blowing action, knives, belts, strings, or rollers. Pearse, et al., "The Use of Flocculants and Surfactants in the Filtration of Mineral Slurries", *Filtration Separation*, Jan.-/Feb., 1983.

Many variables influence filtration efficiency. For example, the cake properties have been reported to be a function of particle size and size distribution, shape, packing, and dimensions of the cake. Fluid properties have been reported to be a function of density and viscosity while interfacial properties have been reported to be a function of surface tension (gas/liquid) and interfacial tension (gas/liquid and gas/solid). Other reported variables include temperature and pressure gradient rate of displacement. Kirk-Othmer, *Encyclopedia of Chemical Technology*, 1984 Supplement, page 310 et seq. Any change in any one of the above variables results in an increase or decrease of the final moisture content of the recovered ore. For instance, by raising the temperature from 15° C. to 80° C., the water viscosity drops by a factor of three and, consequently, the flow rate of water through the cake theoretically is tripled. Occasionally, steam is used to increase filtration rate on drum filters based on such viscosity phenomenon.

In coal, for example, four different types of water have been reported. These types of water include bulk water, capillary water, surface water, and inherent moisture. Bulk water is the water phase in an ore particle slurry or suspension. Particles in close proximity define capillary voids which retain water, i.e. capillary water. A thin sheath of water surrounding a particle due to surface wetting and water adhesion is known as surface water. Finally, moisture is retained in the fine pore structure of the coal and is known as inherent moisture. Blubaugh, et al, "Dewatering Agents in Coal Preparation", Nalco Chemical Company, Reprint 30.

Two distinct classes of chemicals are available for improving filtration properties of mineral ore slurries. The first class comprises flocculant "filter aids". These compounds are most linear, long-chain, water-soluble anionic or nonionic polymers based on polyacrylamide. The polymers bridge individual fine particles giving multi-particle aggregates. The aggregates have greater permeability, allowing for faster flow of water through the cake. These larger aggregates also assist in preventing filter cloth blinding by extremely fine particles. The second reported class of chemical filtration additives comprise surfactant "dewatering aids". The surfactants most often are heteropolar molecules composed of hydrophylic and hydrophobic groups. Commercially, sulfosuccinates are the most widely used surfactant dewatering aid. U.S. Pat. No. 4,156,649 reports the use of ethoxylated linear or branched alcohols as surfactant dewatering aids. U.S. Pat. Nos. 4,206,063 and 4,207,186 add a $C_8$–$C_{18}$ hydrophobic alcohol to an ethoxylated linear branched alcohol as a dewatering aid. Applicant's commonly-assigned application Ser. No. 07/137,763, filed Dec. 24, 1987, is directed to dewatering aids selected from a $C_{10}$ alcohol and a $C_{11}$ alcohol. At slurry temperatures below the solidification temperature of these alcohols, a surfactant capable of emulsifying these alcohols is admixed therewith.

Theories of surfactant action in dewatering contexts include the surfactants concentration at the liquid/air interface resulting in reduction of surface tension, thus allowing filter cake capillaries to drain more readily; or their adsorption on solid surfaces with their hydrophobic group oriented towards the aqueous phase, thus rendering the ore particle surfaces more hydrophobic, i.e. more willing to shed the surface water. Pearse, et al., supra; Fall, et al., "Influence of Energy in Filter Cake Dewatering", *Aufbereitungs-Technik*, No. 3/1987, pp. 115–125; and Purdy, "Chemical Dewatering Aids for Mineral and Coal Slurries", Symposium Chemical Reagents in the Mineral Processing Industry, Feb., 1987. Both theories have validity and have been justified by results reported in the literature. However, each theory has its drawback and at various stages of the filtration process, each will have its dominant role. For example, the reduction of surface tension tends to be important at the onset of the dewatering cycle while increased hydrophobicity tends to dominate towards the end of the dewatering cycle.

Complicating the foregoing are additional factors, such as cracking of the filter cake, bubbles in the filter cake, etc. The elimination of these factors improve filtration efficiency. The thickness of the filter cake (pick-up) influences not only the capacity but the resulting residual moisture. Surfactants can affect these variables positively or negatively.

BROAD STATEMENT OF THE INVENTION

The present invention is directed to a dewatering aid which functions unexpectedly efficiently in the dewatering of a particulate solids slurry, e.g. mineral ore concentrate or slurry, wherein a dewatering aid is added thereto followed by filtration of the slurry. Such improved dewatering results are achieved by adding to the mineral ore slurry, an effective amount of a dewatering aid comprising an alkoxylated $C_6$–$C_{11}$ alkanol or carboxylic acid (alkanoic acid) wherein alkoxylation is conducted with propylene oxide (PO) or butylene oxide (BO), optionally augmented with light ethoxylation with ethylene oxide (EO), e.g. PO/BO:EO being greater than about 3:1.

Advantages of the present invention include the ability to effectively and rapidly improve the dewatering of aqueous particulate solids slurries. Another advantage is the ability to effectively dewater particulate solids with dewatering aids of low odor. These and other advantages will be readily apparent to those skilled in the art based upon the disclosure contained herein.

BRIEF DESCRIPTION OF THE DRAWINGS

The drawing graphically depicts dewatering test results reported in Example 2. This drawing will be described in detail in connection therewith.

DETAILED DESCRIPTION OF THE INVENTION

Conventional dewatering aids often have been based on surfactants Ethoxylated alcohols, for example, can cause problems with undesirable frothing in the process equipment. Hydrophoic alcohols can provide improved dewatering performance; although, they possess an undesirable odor that can make them undesirable due to plant personnel objection. The challenge, then, is to retain the avantageous dewatering performance which $C_{10}$ and $C_{11}$ alkanols yield, as disclosed in U.S.S.N. No. 07/137,763 cited above, yet mask or remove the undesirable odor characteristics possessed by these alkanols. The invention is based upon the discovery that alkoxylation, preferably with propylene oxide and butylene oxide, of hydrophobic alcohols can result in dewatering aids which are effective do not cause unwanted froth, and have less odor than do the alcohols upon which they are based. The alkylene oxide adducts retain a similar hydrophobic character to the alcohols themselves and function in a similar fashion. Propoxylation also retains fluidity of the dewatering aids for use with lower temperature slurries to be dewatered. In this regard, light ethoxylation can be tolerated on occasion for improving cold water dewatering performance and further suppressing undesirable odor characteristics. Light ethoxylation for present purposes comprehends propylene oxide/butylene oxide:ethylene oxide ratios of greater than about 3:1.

Since additional carbon chain length is added to the staring alkanols by virtue of the alkoxylation reaction, of course depending on the number of moles of alkylene oxide added, starting alkanols tend to be on the low end of the hydrophobic alcohol range, viz. $C_6$-$C_{11}$ alkanols are the alkanols of choice for being alkoxylated in accordance with the precepts of the present invention.

The number of moles of alkylene oxide added to the alkanols broadly ranges from about 0.5 to 6 moles, optionally with light ethoxylation as discussed above. In this regard, it also has been discovered that carboxylic acids of the same chain length also can be alkoxylated to yield dewatering aids that perform very much like the alkoxylated alkanols. Thus, $C_6$-$C_{11}$ fatty acids can be alkoxylated to provide another class of dewatering aids in accordance with the present invention.

Generally speaking, the dewatering aid of the present invention finds use in the dewatering of municipal sludge and ore concentrates or slurries of a variety of ores, including, for example, metal sulfides, e.g. copper, lead, zinc, iron, molybdenum, nickel, and the like; iron ore; clay; coal; and the like. Such ore concentrates or slurries generally comprise a solids content ranging from between about 1 and 70%, with the balance being water. Impurities, mixtures of ores, and the like may form the solids content of the slurries. The particle size of the particulate solids concentrates typically range up to about 600 microns in size with particle distribution being a function of the ore concentrate process.

The proportion of dewatering aid utilized ranges from between about 0.025 and 0.50 grams per kilogram of slurry being dewatered. It will be realized that the dewatering aid can be formulated in a hydrocarbon solvent, e.g. like oil, kerosene, or the like, as is conventional in the dewatering mineral ore concentrate field. The weight ratio of dewatering aid to hydrocarbon solvent generally ranges from about 1:10 to 10:1. This combination is effective also when used in an amount of between about 0.25 and 1.0 grams per kilogram of ore concentrate in the slurry.

As described above, the dewatering aid is intimately mixed with the slurry which then is sent to filtration, typically augmented by the application of a vacuum for improving the dewatering kinetics. The preferred propoxylated alcohols and alkanoic acids of the present invention yield filter cakes which exhibit very little, if any, cracking, thus indicating the low moisture content achievable with their use.

The following Examples show how the present invention has been practiced but should not be construed as limiting. In this application, all citations are expressly incorporated herein by reference.

IN THE EXAMPLES

In the Examples, the following laboratory filtration test was devised and was used under the following reported conditions, unless otherwise indicated to the contrary in the Examples. Sample preparation included splitting the concentrate sample into 100 gram charges which were placed in 8 oz. jars. Deionized water (100 ml) was added to the jars and the contents thoroughly shaken for 15 seconds. Reagents were added neat, unless otherwise specified, using microsyringes which were calibrated to 0.1 microliter. A filter paper was inserted into a Buchner funnel (11 cm), moistened, and then a vacuum pump set at 25 inches of mercury was activated. The concentrate with the water and reagent in the jar then were shaken for 15 seconds, unless the effect of the conditioning time was being evaluated. The reagentized slurry then was carefully poured into the Buchner funnel. The sides of the funnel were washed down sparingly with deionized water. The water filtered through the filter cake until all excess water had disappeared from the surface. At this time, a time was set for 1 minute filtration time. At the termination of one minute, the timer automatically switched off the vacuum pump.

The filter cake then was dumped from the Buchner funnel onto a paper towel and transferred to a balance for being weighed. The filter cake then was dried in an oven at 100° C. The dry weight then was recorded. The difference between the wet weight and the dry weight indicated the residual moisture of the filter cake. The residual moistures are compared at various reagent consumption against the moisture obtained with a non-treated filter cake. Room temperature prevailed in all operations. The lower the residual moisture, the more effective the candidate is as a dewatering aid.

EXAMPLE 1

Studies were conducted on the effect of dosage and degree of alkoxylation with propylene oxide (PO) on a $C_8$–$C_{10}$ alkanol (60% $C_8$) mixture. Propoxylation of a $C_{11}$ alkanol also was evaluated. The following results were recorded.

TABLE 1

| Run No. | Moles of PO | Dosage (g/kg) | Residual $H_2O$ (wt-%) |
|---|---|---|---|
| $C_8$–$C_{10}$ Alkanol | | | |
| 1 | 0 | 0.15 | 13.98 |
| 2 | 1.5 | 0.15 | 13.52 |
| 3 | 2.0 | 0.15 | 11.91 |
| 4 | 2.5 | 0.15 | 11.84 |
| 5 | 0 | 0.20 | 12.42 |
| 6 | 1.5 | 0.20 | 11.30 |
| 7 | 2.0 | 0.20 | 10.91 |
| 8 | 2.5 | 0.20 | 10.82 |
| 9 | 0 | 0.25 | 12.23 |
| 10 | 1.5 | 0.25 | 11.31 |
| 11 | 2.0 | 0.25 | 10.39 |
| 12 | 2.5 | 0.25 | 10.06 |
| $C_{11}$ Alkanol | | | |
| 13 | 5 | 0.15 | 9.76 |
| 14 | 5 | 0.20 | 9.65 |
| 15 | 5 | 0.25 | 9.05 |

These results show that, at the levels tested, increased dosages and increased propoxylation both improved dewatering performance. Improved dewatering performance also was seen at increased dosages for the propoxylated $C_{11}$ alkanol.

EXAMPLE 2

The candidate dewatering aids evaluated included a $C_9$ fatty acid alkoxylated 10 moles of propylene oxide/ethylene oxide (5:1 molar ratio), and $C_8$–$C_{10}$ (60% $C_8$) alkanol similarly alkoxylated. Comparative data included a $C_8$–$C_{10}$ alkanol ethoxylated with 10 moles of ethylene oxide and the $C_9$ fatty acid neat. The following results were recorded.

TABLE 2

| Run No. 187-74- | Dewatering Aid Type | Dosage (g/kg) | Filter Time (sec) | Residual Moisture (wt-%) |
|---|---|---|---|---|
| 1 | None | 0 | 39 | 11.58 |
| 22 | $C_9$ Acid | 0.30 | 35 | 11.00 |
| 2 | $C_9$ Acid Alkoxylate | 0.10 | 37 | 11.02 |
| 3 | $C_9$ Acid Alkoxylate | 0.15 | 35 | 10.37 |
| 4 | $C_9$ Acid Alkoxylate | 0.20 | 30 | 9.73 |
| 5 | $C_9$ Acid Alkoxylate | 0.25 | 32 | 9.59 |
| 6 | $C_9$ Acid Alkoxylate | 0.30 | 30 | 9.47 |
| 7 | $C_9$ Acid Alkoxylate | 0.35 | 30 | 9.09 |
| 8 | $C_9$ Acid Alkoxylate | 0.40 | 28 | 8.85 |
| 10 | $C_8$–$C_{10}$ Alkanol Alkoxylate | 0.10 | 35 | 10.17 |
| 11 | $C_8$–$C_{10}$ Alkanol Alkoxylate | 0.15 | 35 | 9.95 |
| 12 | $C_8$–$C_{10}$ Alkanol Alkoxylate | 0.20 | 30 | 9.46 |
| 13 | $C_8$–$C_{10}$ Alkanol Alkoxylate | 0.25 | 30 | 9.30 |
| 14 | $C_8$–$C_{10}$ Alkanol Alkoxylate | 0.30 | 30 | 9.16 |
| 15 | $C_8$–$C_{10}$ Alkanol Alkoxylate | 0.40 | 30 | 8.66 |
| 16 | $C_8$–$C_{10}$ Alkanol Ethoxylate | 0.10 | 34 | 11.04 |
| 17 | $C_8$–$C_{10}$ Alkanol Ethoxylate | 0.15 | 32 | 10.68 |
| 18 | $C_8$–$C_{10}$ Alkanol Ethoxylate | 0.20 | 30 | 10.56 |
| 19 | $C_8$–$C_{10}$ Alkanol Ethoxylate | 0.25 | 35 | 10.30 |
| 20 | $C_8$–$C_{10}$ Alkanol Ethoxylate | 0.30 | 35 | 10.66 |
| 21 | $C_8$–$C_{10}$ Alkanol Ethoxylate | 0.40 | 40 | 11.22 |

The above-tabulated results are displayed graphically in the drawing. It will be observed that the comparative ethoxylated alkanols (Runs 16–21) improved dewatering performance up to a point (e.g. a dosage of about 0.25 g/kg), but then performance deteriorated markedly. These slurries were frothy due to the presence of the ethoxylated alcohols and frothiness is believed to detract from dewatering performance. The inventive alkoxylated alkanols (Runs 10–15) and fatty acids (Runs 2–8), however, provided better dewatering performance at all dosages, including dosages above about 0.25 g/kg. Clearly, the efficacy of the dewatering aids disclosed herein is demonstrated.

We claim:

1. In a method for dewatering an aqueous particulate solid slurry wherein a dewatering aid is added to said slurry followed by filtration thereof, the improvement which comprises using an effective amount for dewatering of a dewatering aid consisting essentially of an alkoxylated $C_6$–$C_{11}$ alkanol or carboxylic acid wherein alkoxylation is conducted with propylene oxide or butylene oxide.

2. The method of claim 1 wherein said dewatering aid used comprises a propoxylated $C_6$–$C_{11}$ alkanol.

3. The method of claim 1 wherein said dewatering aid used comprises a propoxylated $C_6$–$C_{11}$ carboxylic acid.

4. The method of claim 1 wherein said alkanol or carboxylic acid used as a dewatering aid also has been ethoxylated wherein the ratio of propylene oxide or butylene oxide to ethylene oxide is greater than about 3:1.

5. The method of claim 1 wherein said effective amount of said dewatering aid used ranges from between about 0.025 and 0.50 g/kg of said slurry.

6. The method of claim 1 wherein said dewatering aid is dispersed in a hydrocarbon solvent.

7. The method of claim 6 wherein said dewatering aid:hydrocarbon solvent weight ratio ranges from between 1:10 and 10:1.

8. The method of claim 1 wherein said slurry dewatered comprises a mineral ore slurry.

* * * * *